United States Patent Office 3,741,785
Patented June 26, 1973

3,741,785
SILICA TREATED ACICULAR ALKALI
METAL TITANATES
Werner S. Lichtenstein, Chattanooga, Tenn., assignor to
E. I. du Pont de Nemours and Company, Wilmington,
Del.
No Drawing. Continuation-in-part of abandoned application Ser. No. 21,199, Mar. 19, 1970. This application Feb. 23, 1971, Ser. No. 118,082
Int. Cl. C09c 1/36
U.S. Cl. 106—299
6 Claims

ABSTRACT OF THE DISCLOSURE

Precipitation of hydrous silica in an amount ranging from 0.1 to 10 percent by weight of solid titanates present in an aqueous slurry of acicular alkali metal titanates results in a reduction of the formation of agglomerates or grit particles in the resulting titanates.

CROSS-REFERENCE TO RELATED APPLICATION

This application is a continuation-in-part of application Ser. No. 21,199, filed Mar. 19, 1970, now abandoned.

BACKGROUND OF THE INVENTION

Alkali metal titanates in the form of acicular, fibrous, or needle-like particles are well known. When in the pigmentary size range the titanates are particularly useful for application in paper due to their high degree of retention in the paper and their superiority to clay for opacity. The preparation of such alkali metal titanates is described in U.S. Pats. 2,833,620 to Gier, Saltzberg and Young; 2,841,470 to Berry; 3,129,105 to Berry and Sowards; and 3,328,117 to Emslie, Gulledge, Lewis and Willcox. Reference should be made to those patents for the details of preparing titanates of various particle size ranges.

Basically, these acicular titanates can be prepared by calcining a mixture of titanium dioxide with potassium carbonate or hydroxide in the presence of a salt medium such as potassium chloride, quenching the calcine discharge in water and filtering the discharge to remove soluble salts, reslurrying the solid titanate in water, wet grinding the solids by shear action to exfoliate the fibers, hydroclassifying the slurry, filtering the slurry and drying the recovered product. A dry milling step is often added in a preparation of the acicular titanates of the prior art to reduce the agglomerates or grit particles formed while the titanate is contained in the slurry. The presence of grit particles results in degradation of the visual texture and irregular flow and absorption of ink when the product is used in paper.

SUMMARY OF THE INVENTION

It has been discovered that hydrous silica in an amount ranging from 0.1 to 10 percent by weight of the solid titanate in intimate association with an aqueous suspension of acicular alkali metal titanate particles reduces the subsequent formation of agglomerates and grit particles, and markedly improves the grindability of acicular titanate particles. The preferred acicular alkali metal titanates for use with this invention are of pigmentary size, having a small diameter averaging between 0.1 and 0.5 micron and a length-to-diameter ratio of at least 2 and preferably greater than 10. Larger size particles, for example those of 0.5 to 3.0 microns in diameter with length-to-diameter ratios as given previously, can also be used.

One method of introducing hydrous silica is by precipitating the silica in an aqueous slurry of the alkali metal titanate. Preferably, hydrous silica is precipitated when the individual acicular crystals are well separated and dispersed in the slurry. One method of precipitating the silica is to add a solution of soluble silica, for example, sodium silicate or other silicate, to the slurry while adjusting the pH of the slurry to about from 5 to 8. The pH can be adjusted by adding the silica to an acid slurry resulting in neutralization of all or a portion of the acid and precipitation of the silica, or an acid and the silica solution can be added to the slurry simultaneously thereby controlling the pH in the preferred range of from about 5 to 8. Preferably, the silica is added to an alkaline slurry in which the acicular titanates are well separated and dispersed and that is followed by acidification to the neutral range by use of common acids, such as hydrochloric or sulfuric acid. Preferably, the slurry is agitated during the precipitation so that it becomes well dispersed and intimately associated with the titanate particles.

The amount of silica used can range from 0.1 to 10 percent by weight of the solid titanate present. A preferred range of silica where the resulting product is to be used in paper is from about 1 to 10 percent by weight of the solid acicular titanate and, more preferably, from about 1 to 4 percent by weight of the solid titanate used.

The following examples are presented to illustrate the invention and are not to be in limitation thereof. All parts and percentages referred to are by weight unless otherwise indicated.

The effect of the amount of silica precipitated in the slurry in decreasing the agglomerates and grit particles formation is shown in the following example.

EXAMPLE 1

Fibrous potassium titanate of pigmentary size is prepared by calcining a mixture of titanium dioxide and potassium carbonate and recovered as a 4.6 percent suspension of solid pigment particles, all in conventional manner. The particles are found to be pigmentary in that the diameters range from 0.1 to 0.5 micron and the length-to-diameter ratios are chiefly 10 to 1 or greater. Four separate 4-liter portions of this slurry having an initial pH of about 12 are prepared as below, agitated and tested:

Sample A. No silica.
Sample B. Enough sodium silicate solution containing 200 g./l. $SiO_2$ is added to provide 1% $SiO_2$.
Sample C. Sodium silicate solution added to provide 2% $SiO_2$.
Sample D. Sodium silicate solution added to provide 4% $SiO_2$.

Each portion is agitated and is acidified to reduce the pH to 5.0 by adding 2 normal sulfuric acid. The slurries are agitated for one hour with further addition of acid when necessary to stabilize the pH at 5.

Each slurry portion is filtered and the products dried at 125° C. Approximately a 10 gram sample of each portion is slurried in 100 ml. of water, screened and washed on the screen with a gentle stream of water totaling about one pint to determine the initial +200 and +325 mesh (U.S. Standard Sieve Series) grit by weighing the residue on the screen after drying at 110° C. The remaining portions of the dried products are crushed to a flowable powder and milled in a "Hurricane" mill. In this mill the pigment is caught up in a stream of air and carried up through a 12-inch passage through rotating fan blades and rotating impact elements and collected in a small filter bag. These products are also tested for grit. The results are shown in Table I.

TABLE I

| Mesh | Percent initial grit | | Percent grit after milling | |
|---|---|---|---|---|
| | +200 | +325 | +200 | +325 |
| Sample: | | | | |
| A (0% SiO₂) | 41.4 | 44.4 | 1.61 | 8.58 |
| B (1% SiO₂) | 31.5 | 32.7 | 0.64 | 2.48 |
| C (2% SiO₂) | 21.8 | 27.8 | 0.33 | 1.13 |
| D (4% SiO₂) | 14.7 | 15.6 | 0.13 | 0.42 |

EXAMPLE 2

Three stages of two processes, the first process being a control (no silica) and the second using 4 percent silica, are compared at the following steps: (A) The initial slurry of potassium titanate of repulped filter cake; (B) Slurry "A" after 48 hours of stirring; and (C) Slurry "A" after sigma blade mixing of wet 20 percent solids filter cake prior to drying. All slurries are filtered, dried and "Hurricane" milled. The +200 mesh and +325 mesh low shear grit content is determined on all samples after dry milling. The milling rate in grams/min. is noted in Table II.

TABLE II

| Amount of silica precipitated | Milling rate | Percent grit | |
|---|---|---|---|
| | | +200 | +325 |
| None: | | | |
| A Initial | 1.770 | 0.72 | 1.18 |
| B 48 hours agitation of A | 2.000 | 0.63 | 1.95 |
| C Sigma blade mixed, 1 hour | 1.600 | 0.87 | 6.01 |
| 4% SiO₂: | | | |
| A Initial | 1.700 | 0.10 | 0.30 |
| B 48 hours agitation of A | 1.770 | 0.17 | 0.45 |
| C Sigma blade mixed, 1 hour | 2.240 | 0.24 | 2.0 |

The sigma blade mixing for one hour is an extreme test. It simulates large scale handling of filter cake during removal from the filter and extrusion into the drier.

EXAMPLE 3

Acicular potassium titanate after calcination is leached in water, reslurred, wet ground, and acid leached to increase the titanium dioxide content of the product. A first portion of the acid-leached product is used as a control (no SiO₂) and is adjusted to pH 5, filtered and extruded in the form of "noodles" onto a screen drier. The dried product is milled by passage through a "Hurricane" mill at various rates ranging from 1000 to 2200 g.p.m. A second portion of the acid leached product is treated in conventional manner to precipitate 2 percent silica, by weight, on the titanate. The pH is adjusted to 5 and the second portion is treated similar to the first. Approximately a 50 percent increase in grinding rate for a given grit level is obtained as a result of the silica treatment.

In still another test, magnesia (as $MgSO_4 \cdot 7H_2O$) is incorporated in the potassium titanate slurry along with the silicate, with generally improved results in the resulting product as in the earlier examples.

As seen in the above examples, an acicular potassium titanate pigment being intimately associated with hydrous silica in an amount of 0.1 to 10 percent by weight of the solid titanate forms a substantially reduced amount of agglomerates or grit particles. Thus, the need to dry mill the pigment is either eliminated or is substantially reduced, enabling a more economical production of the alkali metal titanates. This is particularly surprising since the known similar treatment of titanium dioxide with a silicate (a common practice) made the product more difficult to grind ar disperse, a result opposite to that discovery in the present invention.

What is claimed is:

1. In a method for preparing an acicular alkali metal titanate by a procedure which includes recovery steps in which the titanate solids are formed into a water slurry, are dried and subsequently are dry milled, the improvement, for increasing the resistance of the titanate solids to the formation of grit particles during said recovery steps, which comprises precipitating hydrous silica in said slurry in an amount of about 0.1 to 10% by weight of the solid titanate present.

2. Method according to claim 1 wherein said alkali metal titanate is potassium titanate having an average diameter of 0.1 to 0.5 micron and a length-to-diameter ratio of at least 2.

3. Method according to claim 1 wherein said alkali metal titanate is potassium titanate having an average diameter of 0.1 to 0.5 micron and a length-to-diameter ratio of at least 10 and wherein the hydrous silica is precipitated in an amount of from about 1 to 10% by weight of the alkali metal titanate.

4. Method according to claim 3 wherein the hydrous silica is precipitated in an amount of from about 1 to 4% by weight of the alkali metal titanate.

5. An acicular alkali metal titanate produced by the method of claim 1.

6. An acicular alkali metal titanate produced by the method of claim 3.

References Cited

UNITED STATES PATENTS

| 3,594,205 | 7/1971 | Gulledge et al. | 106—299 |
| 3,471,438 | 10/1969 | Chwastiak | 106—308 B |
| 2,885,366 | 5/1959 | Iler | 106—308 B |

JAMES E. POER, Primary Examiner

U.S. Cl. X.R.

106—308 B